(12) United States Patent
Katrib

(10) Patent No.: US 11,705,028 B2
(45) Date of Patent: Jul. 18, 2023

(54) MOBILE DEVICE FIXTURE FOR AUTOMATED CALIBRATION OF ELECTRONIC DISPLAY SCREENS AND METHOD OF USE

(71) Applicant: GeoPost, Inc., Los Angeles, CA (US)

(72) Inventor: Ramy Katrib, Studio City, CA (US)

(73) Assignee: GeoPost, Inc., Los Angeles, CA (US)

( * ) Notice: Subject to any disclaimer, the term of this patent is extended or adjusted under 35 U.S.C. 154(b) by 100 days.

(21) Appl. No.: 17/353,767

(22) Filed: Jun. 21, 2021

(65) Prior Publication Data

US 2021/0398464 A1 Dec. 23, 2021

Related U.S. Application Data

(60) Provisional application No. 63/041,414, filed on Jun. 19, 2020, provisional application No. 63/041,447, filed on Jun. 19, 2020.

(51) Int. Cl.
| | |
|---|---|
| *H04N 7/18* | (2006.01) |
| *G09G 3/00* | (2006.01) |
| *G06T 7/00* | (2017.01) |
| *H04N 23/695* | (2023.01) |

(52) U.S. Cl.
CPC .......... *G09G 3/006* (2013.01); *G06T 7/0002* (2013.01); *H04N 23/695* (2023.01); *G09G 2320/0693* (2013.01)

(58) Field of Classification Search
CPC ........ H04N 7/18; H04N 23/695; G09G 3/006; G09G 2320/0693; G06T 7/0002
See application file for complete search history.

(56) References Cited

U.S. PATENT DOCUMENTS

| | | | |
|---|---|---|---|
| 5,083,195 | A | 1/1992 | Evelin |
| 5,479,186 | A | 12/1995 | McManus et al. |
| 5,485,284 | A | 1/1996 | Shono et al. |
| 5,499,040 | A | 3/1996 | McLaughlin et al. |
| 5,510,851 | A | 4/1996 | Foley et al. |
| 6,459,425 | B1 | 10/2002 | Holub et al. |
| 6,784,995 | B2 | 8/2004 | Merle et al. |
| 7,102,648 | B1 | 9/2006 | Holub |
| 7,710,433 | B2 | 5/2010 | Holub |
| 7,907,154 | B2 | 3/2011 | Rykowski et al. |
| RE44,149 | E | 4/2013 | Herbert |

(Continued)

*Primary Examiner* — Trang U Tran
(74) *Attorney, Agent, or Firm* — Makoui Law, PC; Ali Makoui

(57) ABSTRACT

A fixture that is configured to hold a mobile device for calibrating an electronic display screen includes an adjustable arm, a controller including a processor, one or more motors, one or more suction cups configured to attach the fixture to the electronic display screen, one or more brackets, attached to the arm, to hold the mobile device such that the camera of the mobile device points towards the electronic display screen. The processor of the controller is configured to receive one or more signals from the mobile device to move the adjustable arm to point the camera of the mobile device towards a point on the electronic display screen, and in response to receiving the signals from the mobile device, send one or more signals to the motors to move the adjustable arm to point the camera of the mobile device towards the point on the electronic display screen.

20 Claims, 11 Drawing Sheets

(56) References Cited

U.S. PATENT DOCUMENTS

| | | | |
|---|---|---|---|
| 8,705,151 B2 | 4/2014 | DiCarlo | |
| 8,819,983 B2 * | 9/2014 | Tate | F16M 13/022 |
| | | | 124/88 |
| 10,591,108 B2 * | 3/2020 | Scott | F16B 2/10 |
| 10,737,140 B2 * | 8/2020 | Rothman | A63B 21/0783 |
| 10,965,875 B2 * | 3/2021 | Guo | G03B 17/561 |
| 11,015,324 B2 * | 5/2021 | Clarke | B25J 15/0066 |
| 11,071,601 B2 * | 7/2021 | Staid | A61B 34/30 |
| 2003/0058202 A1 | 3/2003 | Evanicky et al. | |
| 2004/0196250 A1 | 10/2004 | Mehrotra et al. | |
| 2004/0218233 A1 | 11/2004 | Edge | |
| 2004/0246274 A1 | 12/2004 | Rykowski et al. | |
| 2006/0007170 A1 | 1/2006 | Wilson et al. | |
| 2006/0280360 A1 | 12/2006 | Holub | |
| 2007/0121133 A1 | 5/2007 | Bourgoin et al. | |
| 2009/0060473 A1 * | 3/2009 | Kohte | F16M 11/14 |
| | | | 386/362 |
| 2009/0122132 A1 | 5/2009 | Thielman | |
| 2016/0057399 A1 | 2/2016 | Holub | |
| 2016/0295089 A1 * | 10/2016 | Farahani | B60R 11/02 |
| 2019/0082932 A1 * | 3/2019 | Schoonbaert | A61B 1/00052 |
| 2020/0185939 A1 * | 6/2020 | Gladstone | B62K 11/14 |
| 2021/0387347 A1 * | 12/2021 | Koci | B25J 18/025 |

* cited by examiner

MOBILE DEVICE FIXTURE FOR AUTOMATED CALIBRATION OF ELECTRONIC DISPLAY SCREENS AND METHOD OF USE

CLAIM OF BENEFIT TO PRIOR APPLICATIONS

This application claims the benefit of U.S. Provisional Patent Application Ser. No. 63/041,414, filed on Jun. 19, 2020, and U.S. Provisional Patent Application Ser. No. 63/041,447, filed on Jun. 19, 2020. The contents of U.S. Provisional Patent Application 63/038,073 and U.S. Provisional Patent Application Ser. No. 63/041,447 are hereby incorporated by reference.

BACKGROUND

Photonics pertains to the physical science of light (photon) generation, detection, and manipulation through emission, transmission, modulation, signal processing, switching, amplification, and sensing. Optical or photonic metrology is the science and technology concerning measurements with light. Such measurements target properties of light and light sources. For example, when calibrating an electronic display screen, optical metrology is used when taking measurements to determine whether the electronic display screen is correctly transmitting a correct frequency and magnitude of visible or near visible light. Laboratory spectrometers or colorimeters, such as those used in precision light scanners, have been used to calibrate electronic display screens.

Color calibration of electronic display screens focuses on the metrology of color and the methods to regulate color transmission in an efficient manner. When a person views a screen, light from the screen enters the eye and is collected by several types of photoreceptor cells in the retina. The proportion of light collected by these cells is sent to the brain and sensed as color. In practice, the simple proportion of light collected undergoes various processing as it passes along the nerves before being recognized by the person as color. Color measurements are a method of expressing the colors sensed by humans as values. Color measurements are related to method of measurement, spectral characteristics of the screen and the spectral sensitivity characteristics of the human eye. As the spectral distribution of the screen and the spectral sensitivity characteristics of the eye are defined, a color value may be calculated. Color measurements typically require a wavelength range from 380 nm to 780 nm, which is equivalent to the wavelengths that are sensed by the human eye. Color measurements may be made by calculations based on a visible spectrum sensor across this wavelength range.

BRIEF DESCRIPTION OF THE DRAWINGS

The various embodiments of the present mobile device fixture for automatic calibration of electronic display screens and the corresponding method of use now will be discussed in detail with an emphasis on highlighting the advantageous features. These embodiments depict the novel and non-obvious mobile device fixture for automatic calibration of electronic display screens and the corresponding method of use shown in the accompanying drawings, which are for illustrative purposes only. These drawings include the following figures, in which like numerals indicate like parts.

DETAILED DESCRIPTION

Figure 1:
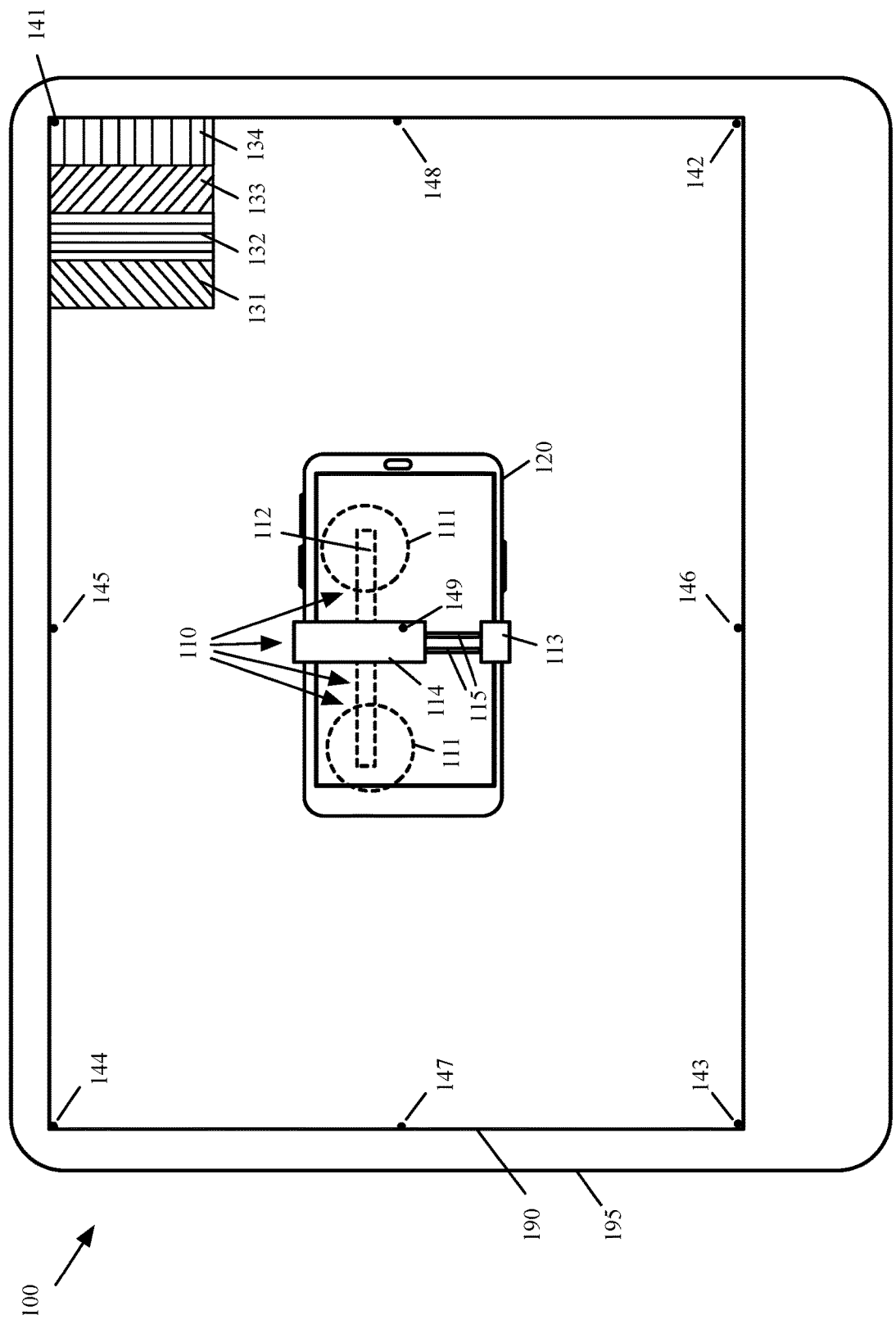
FIG. 1 is a front perspective view of one example embodiment of a system for automatic calibration of electronically generated images, according to different aspects of the present disclosure.

One aspect of the present embodiments includes the realization that laboratory spectrometers or colorimeters, such as those utilized in precision light scanners, that are used to calibrate electronic display screens must process the scanned light in high resolution. As a result, the image may be difficult to be scanned in the field. Furthermore, these pieces of equipment generate gigabytes of image data from a single scan, resulting in large data storage requirements. Large image data may require long post image processing time. These pieces of equipment are bulky, making them unpractical for common or widespread use. For example, the bulky equipment are difficult to carry and deploy in the field, and require bench space and power lines in a laboratory setup. Calibrating an electronic display screen at home or office using the existing systems, require using specialized equipment and hiring trained personnel to calibrate the displays. The total time required to calibrate an electronic display screen with the existing methods may be in the order of several hours.

Some of the present embodiments solve the aforementioned problems by using mobile devices, such as, smartphones and tablet computers for calibrating electronic display screens. These embodiments use the large-capacity, high-performance central processing units (CPUs), graphics processing units (GPUs), memory, image sensors (e.g., cameras), and/or network interfaces of these small and mobile devices to take images of, and calibrate, the electronic display screens. Additionally, these mobile devices have the ability to connect to other electronic devices through the Internet and/or other networks, and have the ability to incorporate an ever increasing perennial amount of high-performance imaging resources (including, e.g., imaging software, imaging hardware, etc.).

Some of the present embodiments provide a fixture for holding and moving a mobile device to capture images of an electronic display screen. The fixture, in some embodiments, may include suctions cups to attach the fixture to the electronic display screen that is being calibrated. The fixture, in some embodiments, may include one or more motors that move a mobile device connected to the fixture to point the mobile device's camera to specific points on the electronic display screen. In some of these embodiments, a calibration application program executed on the mobile device may send patterns to the electronic display screen to display. The calibration application program may control the mobile device's camera to take images of the displayed patterns from different points of the electronic display screen.

The image properties may then be compared with the expected properties of the displayed patterns for the particular electronic display screen to determine whether the electronic display screen needs calibration. When the calibration application program determines that the electronic display needs calibration, the calibration application program may send calibration information to the electronic display screen.

The calibration system of the present embodiments provides the technical advantage of eliminating the need for spectrometers, colorimeters, and other bulky and difficult to use equipment. What is needed to calibrate an electronic display screen is a mobile device, an application program, and a fixture to point the mobile device to different points on the electronic display screen. The calibration application program controls the movement of the fixture based on the type and/or the model of the electronic display screen to automatically perform the calibration. In some embodiments, the calibration application program may use a machine learning model that is trained based on the specific physical and electronic properties of the electronic display screen (e.g., size, display technology, shape of the display screen, display modes, etc.), the expected pixel data (intensity, color, movement) of the displayed patterns, etc., to generate calibration test procedures for different electronic display screens. The total time required to calibrate an electronic display screen using the calibration system of the present embodiments may be reduced to a few minutes (e.g., to about 1-2 minutes), including the setup.

The remaining detailed description describes the present embodiments with reference to the drawings. In the drawings, reference numbers label elements of the present embodiments. These reference numbers are reproduced below in connection with the discussion of the corresponding drawing features.

FIG. 1 is a front perspective view of one example embodiment of a system for automatic calibration of electronically generated images, according to different aspects of the present disclosure. With reference to FIG. 1, a system 100 for calibrating electronically displayed images is provided. In some of the present embodiments, the system 100 may include a securing fixture 110 configured to secure an electronic device 120 in a position facing the display screen 190 of a display apparatus 195. Examples of the display screen (also referred to as monitors) include, for example, and without limitations, liquid crystal display (LCD) display screens, light emitting diode (LED) display screens, organic light emitting diode (OLED) display screens, plasma monitor panel (PDP) display screens, and cathode ray tube (CRT) display screens. The shape of the display screens may be flat or curved. The electronic display screen 190 may be a computer display, a television (TV) display, a monitor, a mobile device display (e.g., a tablet displays, a smartphone display), etc. Other than the electronic display screen 190, the display apparatus 195 may include the circuitry to display images on the electronic display screen 190, a housing, a stand, etc.

The electronic device 120 may include one or more cameras (e.g., the camera 290 of FIGS. 2-4) that may include one or more image sensors. In some embodiments, the electronic device 120 may be a mobile electronic device such as, for example, a smartphone (e.g., the smartphone 120 of FIG. 1), a tablet computer, and/or any other suitable mobile electronic device.

In some embodiments, the system 100 pertains to a metrologically-oriented mobile device securing fixture 110 (refereed herein as the calibration fixture). In some embodiments, the calibration fixture 110 may be a smartphone securing mechanism that accurately facilitates the operation for using one or more image sensors of the smartphone to record and measure electronically generated images in a precise and repeatable manner during the calibration of an electronic display screen.

In some embodiments, the system 100 may use the small mobile electronic device (e.g., a smartphone), as a calibration tool to perform the function of a bulky and difficult to use laboratory spectrometer. Due to the smartphone's size and ability to perform high-quality image processing and capturing capabilities, it is not necessary to provide a separate imaging sensor, storage device, and/or transfer device. These components are an integral part of the smartphone itself (acting as a spectrometer), enabling a far simpler, and practical, means of electronic screen display calibration.

With continued reference to FIG. 1, the fixture 110 may be attached to the display screen 190 by one or more (in this example by two) two suction cups 111. The suction cups 111, in the front view of FIG. 1 are hidden behind the mobile device 120. The suction cups 111 may be connected to a plate 112, which is also hidden behind the mobile device 120 in the front view of FIG. 1. The suction cups 111 may be manually placed over a region, for example, and without limitations, the center region, of the display screen 190 being calibrated.

Figure 2:
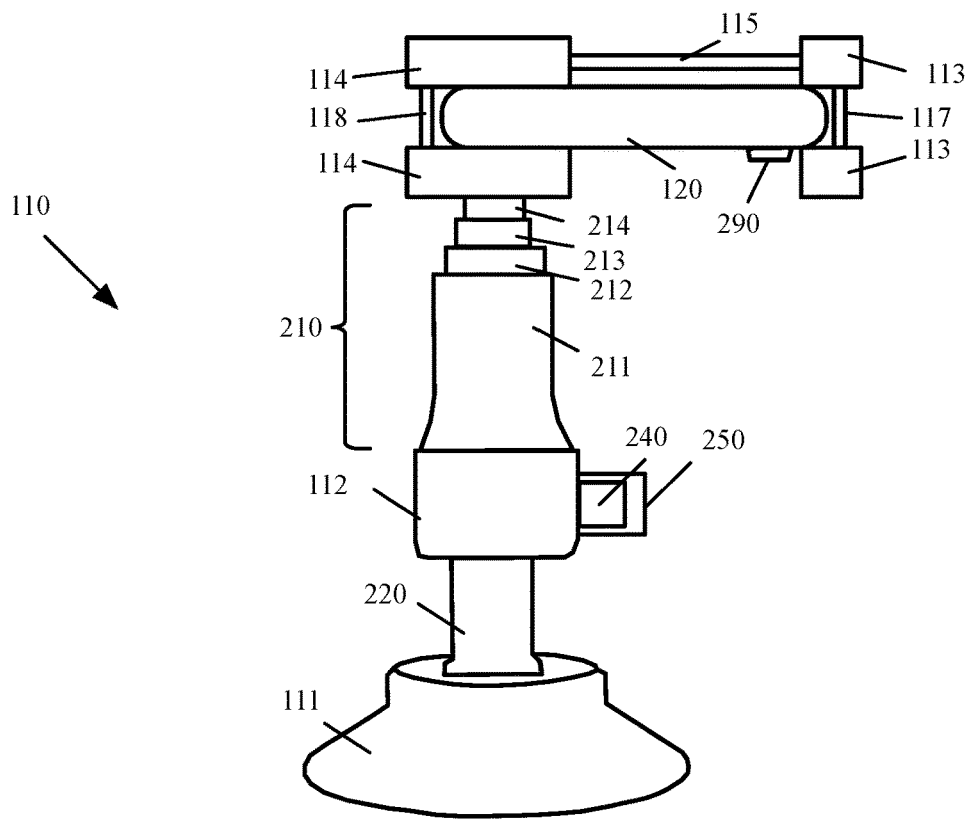
FIG. 2 is a left side view.
Figure 3:
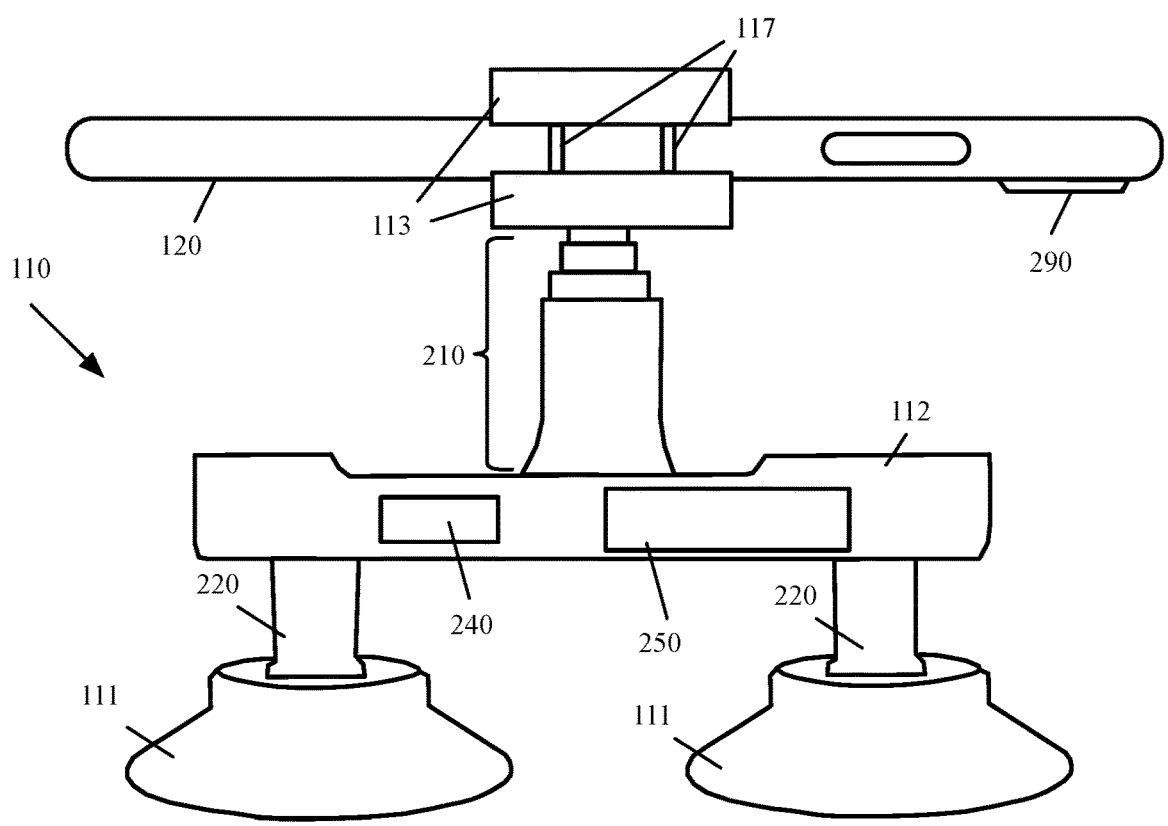
FIG. 3 is a bottom view, of the fixture of FIG. 1 that is shown holding a mobile device, according to different aspects of the present disclosure.

The brackets 113 and 114 may be connected to the plate 112 by a rotatable, tiltable, and/or bendable arm 210 (FIGS. 2-3). The brackets 113 and 114 may hold the mobile device 120. As described below, the adjustable arm may rotate and/or tilt the attached mobile device 120, such that the image sensor of the mobile device 120 may face different points on the display screen 190. The distance between the two brackets 113 and 114 may be adjusted (e.g., by one or more adjustable shafts 115) to fit mobile devices with different width.

It should be noted that in the example of FIG. 1, the suction cups 111 are aligned in a horizontal line (in the depicted orientation). The suction cups 111, however, may be positioned in a vertical line or in a diagonal alignment. As described below, the fixture 110 provides the ability to rotate and/or tilt the mobile device such that the mobile device's image sensor points to specific points or regions on the display screen 190 regardless of the position of the suction cups 111. Further details of the fixture 110 are described below with reference to FIGS. 2-4 and 6-11.

With continued reference to FIG. 1, the electronic display screen 190 that is being calibrated may display one or more images 131-134 during calibration. The same or different images 131-134 may be displayed at different regions on/or at different times during calibration. Each image 131-134 may include a set of patterns with known parameters, such as, known pixel color values, known pixel intensity values, etc.

The mobile device 120 of the present embodiments may be affixed to the fixture 110 such that the camera of the mobile device 120 may face the display screen 120 that is being calibrated. The position of the mobile device 120 may then be changed multiple times such that the camera of the mobile device 120 points to pre-determined points (or regions) of the electronic display screen 190, such as, for example, and without limitations, one or more of the upper right 141, the lower right 142, the lower left 143, the upper left 144, the upper center 145, the lower center 146, the left center 147, the right center 148, the middle 149, etc. In some embodiments, the image sensor on the mobile device 120 may be aligned over one pixel in a region on the electronic display.

Figure 4:
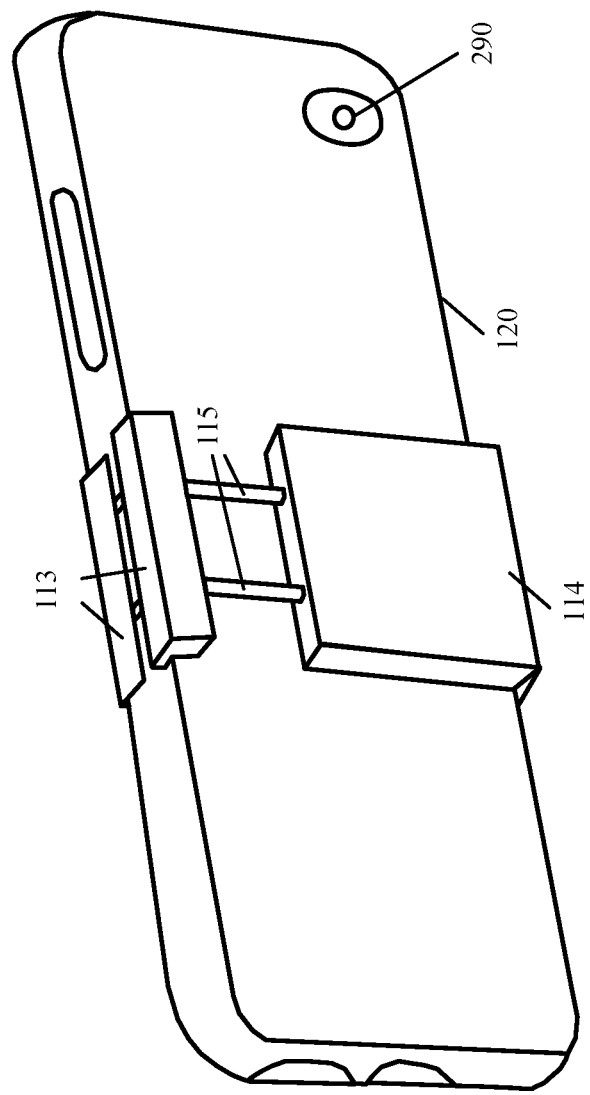
FIG. 4 is a back perspective view of a portion of the fixture and the mobile device of FIGS. 2-3, according to different aspects of the present disclosure.

FIG. 2 is a left side view, and FIG. 3 is a bottom view, of the fixture of FIG. 1 that is shown holding a mobile device, according to different aspects of the present disclosure. FIG. 4 is a back perspective view of a portion of the fixture and the mobile device of FIGS. 2-3, according to different aspects of the present disclosure. It should be noted that the terms left side view and bottom view are with reference to the orientation of the fixture 110 in the front view of the example of FIG. 1. As indicated above, the suction cups 111 may be aligned differently on the display screen 190 of FIG. 1, and therefore, the fixture 110 may have different side views and bottom views depending on how the suction cups 111 are attached on the display screen 190.

With reference to FIGS. 2-4, the fixture 110 may include the suction cups 111, the plate 112, the brackets 113 and 114, the adjustable arm 210, the shafts 220, the controller 240, and/or one or more motors 250. The suction cups 111 may be configured such that, when attached to a display screen (e.g., the display screen 190 of FIG. 1), enough suction force is generated to firmly hold the rest of the fixture 110 and the mobile device 120. The suction cups 111 may be connected to the plate 112 by the shafts 220. The plate 112 may be configured to have different shapes and dimensions, such as, for example, and without limitations, a substantially rectangular shape. The plate 112 may be configured such that different components of the fixture, such as, the adjustable arm 210, the shafts 220, the controller 240, and/or the motors 250 may be attached to the plate 112.

The distance between the two brackets 113 and 114 may be adjusted (e.g., by one or more adjustable shafts 115) in order to fit mobile devices with different width. The width of the bracket 113 and the width of the bracket 114, in some embodiments, may be adjustable to hold mobile devices with different thicknesses. For example, and without limitations, the bracket 113 may include two separate plates, and the distance between the two plates may be adjusted by one or more shafts 117. The bracket 114 may include two separate plates, and the distance between the two plates may be adjusted by one or more shafts 118 in some embodiments. Other embodiments may use a different mechanism for the brackets 113 and 114 to adjust them to the widths of different mobile devices. For example, in some embodiments, the brackets 113 and/or 114 may be clips (e.g., alligator clips), or clamps, with jaws that may be opened to provide adjustable grip for different thicknesses of mobile devices. The jaws may be made of, or covered by, a soft material such as plastic or rubber, to prevent damage to the mobile device 120.

The arm 210, in some embodiments, may be connected to the brackets 113 and 114. The arm 210 may be rotatable, tiltable, and/or the length of the arm 210 may be adjustable to allow the image sensor(s) of the mobile device's camera(s) 290 to point to different points on the display screens 190 (FIG. 1) that may have different sizes and shapes. The arm, 210 may rotate around an axis to rotate the mobile device 120 and the camera 290.

Figure 6:
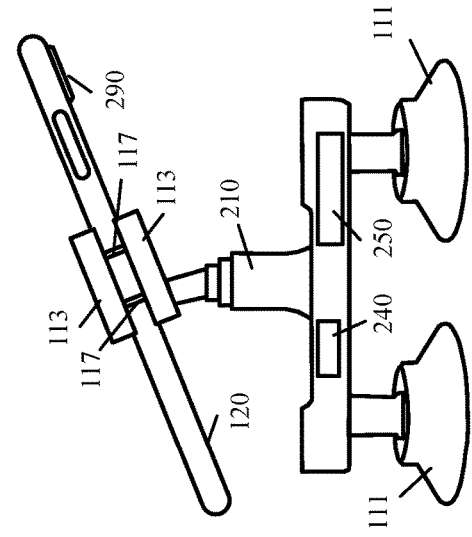
FIGS. 6-9 illustrate several examples of rotating, tilting, and/or adjusting the length of the fixture arm to point the mobile device's camera(s) to different points of an electronic display screen, according to different aspects of the present disclosure.
Figure 7:
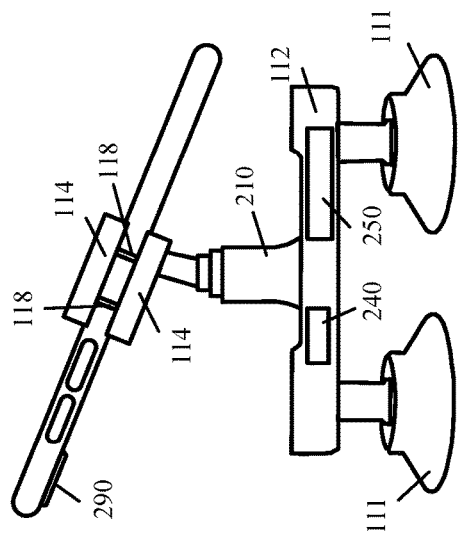
Figure 8:
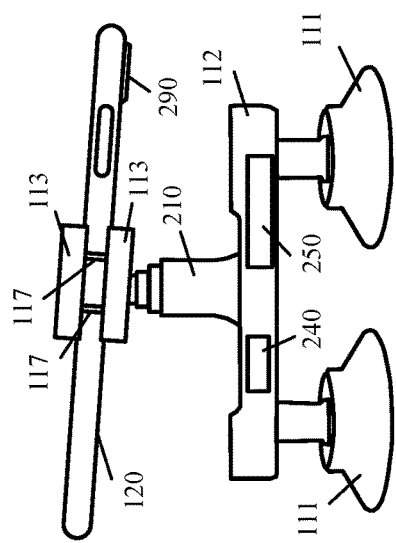
Figure 9:
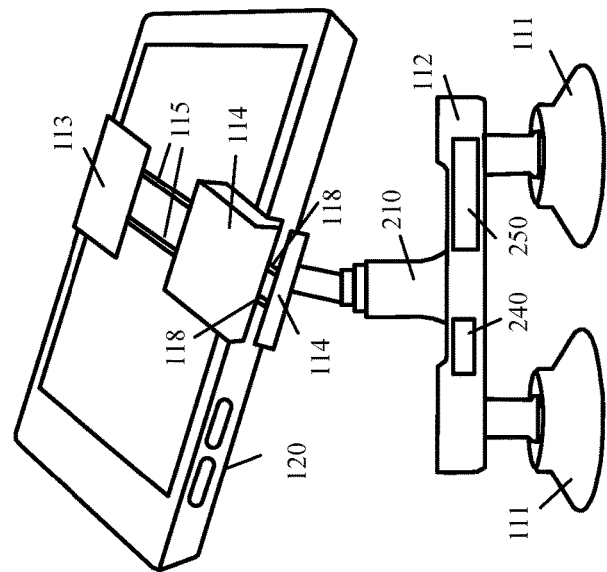

The arm 210, in some embodiments, may be configured to move along an axis, substantially in a vertical plane, to move the mobile device such that the mobile device's surface is substantially parallel to the surface of the electronic display screen (e.g., as shown in FIGS. 6, 7, and 9). The arm 210, in some embodiments, may be further configured to move along two or more axes that are not in a vertical plane, to move the mobile device such that the mobile device's surface is tilted against the surface of the electronic display screen (e.g., as shown in FIG. 8).

As a non-limiting example, the arm 210 may include a gooseneck shaft that may include a spring inside. The spring may be made of a high-strength metal such as steel to provide flexibility. The flexible shaft may include a layer of soft cover compressed over the gaps of the spring's coil to create the bendable segments to allow the shaft to be bended and hold its position. As another non-limiting example, the arm 210 may be configured to move along one axis substantially in the same vertical plane and/or along multiple axes in different vertical planes to provide 3D movements to the arm and to the mobile device that is connected to the fixture 110.

The length of the arm 210, in some embodiments, may be adjustable to change the distance of the mobile device 120 and the camera(s) 290 from the display screen's surface. As a non-limiting example, the arm 210 may include (e.g., as shown in the depicted embodiment) two or more telescopic segments 211-214. The inner diameter of a first section of the arm 210 (e.g., section 211) may be substantially similar to the outer diameter of a second, adjacent, section (e.g., section 212) such that section 212 may telescopically slide within the section 211. The arm 210, may be configured to move the mobile device in a three dimensional (3D) space. Although the base of the arm 210 is shown as being fixed to the plate 112, in some embodiments, the arm 210 may slide in a rail (not shown) on the plate 112 to provide a further range for moving the mobile device 120.

The fixture 110, in some embodiments, may include a controller 240 and one or more motors 250 to control the movements of the arm 210. The controller 240 may include one electronic circuitry that may receive signals from the mobile device to control the motor(s) to rotate, tilt, and/or adjust the length of the arm 210. The controller 240 may provide control of the mobile device movements in X-axis, Y-axis, and Z-axis.

It should be noted that although two brackets 113 and 114 are shown in the example of FIGS. 1-4, different embodiments may include one or more brackets to hold the mobile device. For example, the fixture may have one bracket (instead of the two brackets 113 and 144) that may be in the shape of a clip or clamp with jaws that may be opened to provide adjustable grip for different widths of mobile devices. Other embodiments may include more than two brackets on each side of the mobile device to provide more grip and better stability.

Figure 5:
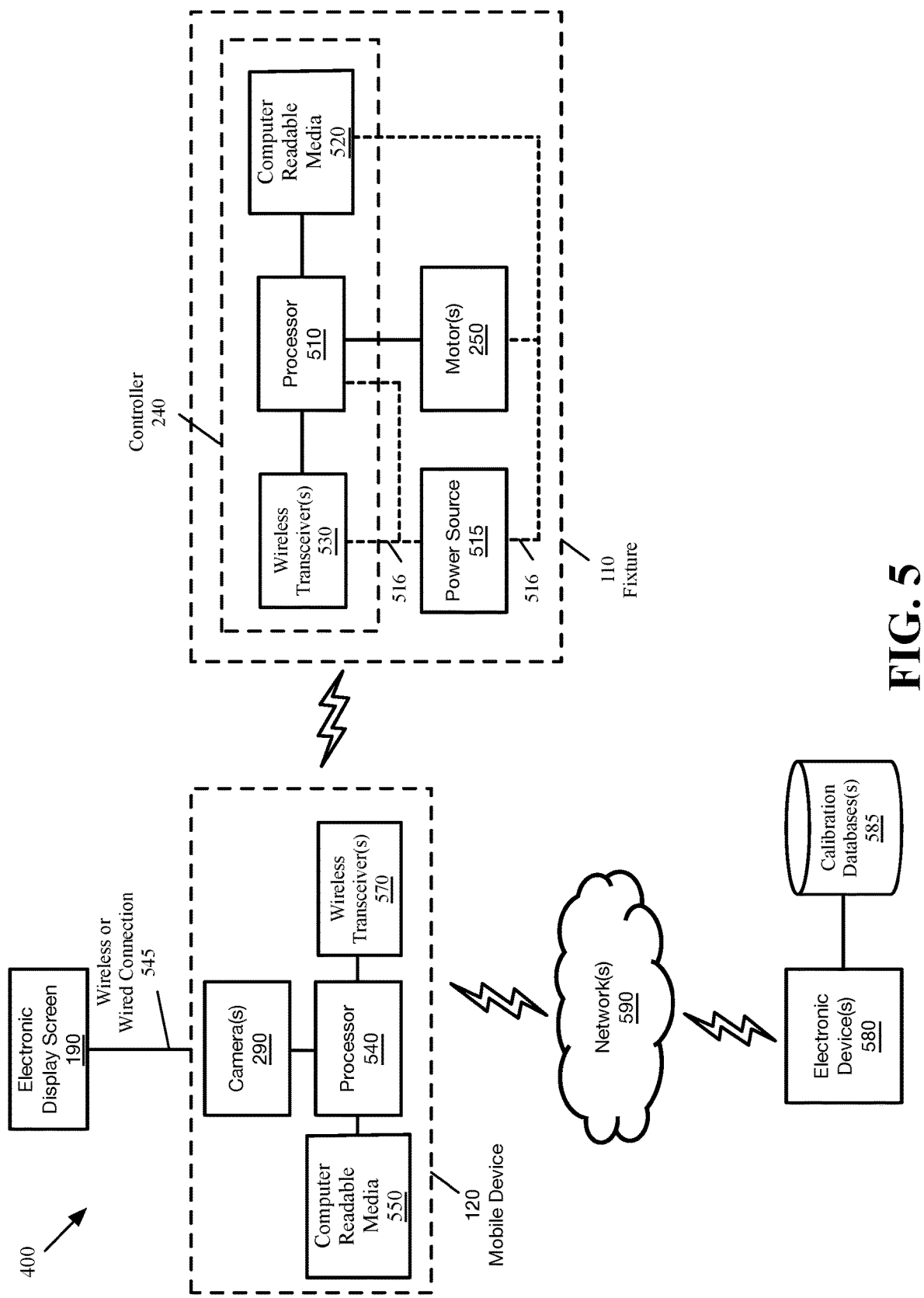
FIG. 5 is a functional block diagram illustrating an example electromechanical and electrical system for calibrating an electronic display screen, according to different aspects of the present disclosure.

FIG. 5 is a functional block diagram illustrating an example electromechanical and electrical system for calibrating an electronic display screen, according to different aspects of the present disclosure. With reference to FIG. 5, the fixture 110 may include the controller 240 and one or more motors 250. The controller 240 of the fixture 110 may include a processor 510, computer readable media 520, one or more wireless transceiver(s) 530, and/or a power source. The computer readable media 520, may be volatile memory and/or non-volatile memory, to store data and/or computer readable instructions that are needed by the processor 510 to communicate with the mobile device 120 and to control the motor(s) 250.

The power source 515, in some embodiments, may be one or more batteries, which may be rechargeable and/or replaceable. The power source 515, in some embodiments, may be a power adaptor that may receive power from the mobile device 120 and/or from the electronic display screen 190. The fixture 110, in some embodiments, may include a switch (not shown) to turn the power on or off. The power source 515 may provide power to the motor(s) 250 and the components of the controller 240 through one or more wires 516. The fixture 110, in some embodiments, may include an identification, that may be provided to the mobile device's processor 540 (e.g., by the processor 510 of the fixture or entered through a user interface of the calibration application program of the mobile device 120).

With further reference to FIG. 5, the mobile device 120 may include a processor 540, computer readable media 550, one or more cameras 290, and one or more wireless transceiver(s) 570. Further details of the mobile device 120 are not shown for simplicity. The mobile device 120 and the fixture 110, in some embodiments may wirelessly communicate through the wireless transceivers 530 and 570. In other embodiments (e.g., when the fixture 110 does not include the wireless transceiver(s) 530), the mobile device 120 and the fixture 110 may communicate through a wired link (not shown).

With reference to FIG. 5, the mobile device 120 may include a calibration application program that may be stored in the computer readable media 550. The calibration application program may be used to calibrate (e.g., to adjust the color of and/or intensity of) the pixels and/or subpixels of electronic display screens, such as the electronic display screen 190.

Depending on the capabilities of the electronic display screen 190 (or the capabilities of the display apparatus 195 of FIG. 1), mobile device 120 may communicate with the electronic display screen 190 through a wired or wireless communication link 545. The wireless link, in some embodiments, may use a short-range communication protocol, such as, for example, and without limitations, Bluetooth, Wi-Fi, Zigbee, etc. The wired connection may include the appropriate connectors to connect the mobile device to the display apparatus 195.

The processor 540 may receive the identification (e.g., and without limitations, the model) of the electronic display screen 190 through the link 545. For example, the mobile device 120 may send one or more signals to the electronic display screen 190 and may request the electronic display screen's 190 identification. In response, the display apparatus 195 may send the identification of the electronic display screen 190 to the processor 540.

The processor 540, in some embodiments, may use the identification to retrieve one or more calibration test procedures to calibrate the electronic display screen 190. In some embodiments, the processor 540 may make the table look-up using one or more tables or databases that are stored in the computer readable media 550 of the mobile device 120. In other embodiments, the processor 540 may send the electronic display screen's identification to one or more electronic devices 580 through the networks 590. In response, the processor 540 may receive the calibration test procedure(s) of the electronic display screen 190 from the electronic device(s) 580. The electronic device(s) 580 may be, for example, networked devices, such as servers, that may retrieve the calibration test procedure(s) of the electronic display screen 190 through a table look-up. For example, the electronic device(s) 580 may make a loop-up into one more tables or one or more databases 585 to retrieve the calibration test procedure(s) that correspond(s) to the electronic display screen's identification.

The calibration test procedure(s) of the electronic display screen 190 may include information that may be needed to perform a calibration test of electronic display screen 190. For example, and without limitations, the calibration test procedure may specify the signals to send to the electronic display screen 190 to initialize the display screen prior to the calibration test, the images to send to the electronic display screen to display during the calibration test, the signals to send to electronic display screen 190 to place the electronic display screen in different known display modes during the test, etc. The calibration test procedure(s) may specify the locations of the points on the display screen to focus the mobile device's camera and take images. These locations may be used during the calibration test to move the adjustable arm 210 (FIGS. 2-4) of the calibration fixture 110 to point the camera 290 of the mobile device 120 to the points specified in the calibration test procedure(s).

The calibration test procedure(s) of the electronic display screen 190 may also include information for calibration the electronic display screen 190 should the calibration test detects that the electronic display screen may need calibration. For example, and without limitations, the calibration test procedure(s) may specify signals to send to the electronic display screen 190 to calibrate the display screen, signals to send to the electronic display screen 190 to correct specific issues detected during the calibration test, etc.

To generate the calibration test procedures, some embodiments may use machine learning. In these embodiments, the machine learning algorithm (or model) may be trained by using the known electronics and image characteristics of different display screens (e.g., numbers and arrangements of pixels and/or sub-pixels, different display modes, the optimal color and intensity of the pixels and/or sub-pixels in each display mode, etc.), the known physical characteristics of different display screens (e.g., size, surface curvature, etc.), the communication protocols used to communicate with different display screens (e.g., to retrieve the identification and to send calibration data), the images (e.g., the color or intensity of the patterns in the images) needed to display during calibration, the known image characteristics of different type of mobile device's image sensors, the known physical characteristics of different mobile devices (e.g., the size, the location of the camera), etc. The known data may then be used as the expected output of the machine learning algorithm during training. The machine learning algorithm may be fine-tuned to generate results that are close to the expected results.

After the machine learning algorithm is trained, the algorithm may be used (e.g., by the calibration application program of the mobile device 120) to calibrate different electronic display screens. The calibration application program may use the electronic display screen's 190 identification to retrieve the corresponding calibration test procedure(s). The calibration application program may use the calibration test procedure(s), for example, and without limitations, to set the electronic display screen to an initial state before starting the test, to select a display mode (if applicable), to select the images (e.g., the images 131-134 of FIG. 1) to be displayed on the display screen 190 during the calibration test, the points (e.g., one or more of the points 141-149 of FIG. 1) to which the image sensor(s) of the mobile device's camera(s) 290 may point, the amount of rotation, tilt, and/or length adjustment that arm 210 (FIGS. 2-3) of the fixture 110 may require to point the image sensor(s) of the camera(s) 290 to the correct point on the display screen 190, etc. In some embodiments, the camera(s) may take images of the display screen 190 and the calibration application program may analyze the images to determine whether the image sensor(s) of the camera(s) 290 are pointing towards a specific point at each step of calibration prior to taking the images used for the calibration test.

The processor 510 of the controller 240 may communicate with the processor 540 of the mobile device 120 and may receive one or more signals to rotate, tilt, and/or adjust the length of the arm 210 (FIGS. 2-3) to point the camera(s) 290 to a point on the electronic display screen, such as one of the points 141-149 (FIG. 1). In response, the processor 510 of the controller 240 may send one or more signals to the motor(s) 250 to rotate, tilt, and/or adjust the length of the arm 210 (FIGS. 2-3) in order to point the camera(s) 290 of the mobile device, which is attached to the fixture 110, to one of the points 141-149. The motor(s), in some embodiments, may be small (e.g., miniaturized) motors that are configured to move the arm 210 in different 3D directions. The motor(s) may use additional mechanical components (not shown), such as, gearboxes, shafts, etc., to transfer the rotational movements of the motor(s) into the 3D movements of the arm 210.

The processor 510 may then send one or more signals to the camera(s) 290 to focus the camera(s) and take images of the electronic display screen 190. The calibration application program may then analyze the images and compare the color and intensity values of different pixels and sub-pixels of the images with the corresponding expected values. The calibration application program may send one or more signals to the electronic display screen 190 to adjust the color and/or intensity of different pixels and sub-pixels when the calibration application program determines that the display screen (e.g., some of the pixels and/or sub-pixels of the display screen) require calibration.

In some embodiments, some steps of the calibration process may be performed by the electronic device(s) 580. For example, as described above, the electronic device(s) 580 may receive the identification of the electronic display screen 190 and may send the calibration test procedure(s) of the electronic display screen 190 to the processor 540. In some embodiments, the electronic device(s) 580 may select the images, such as the images 131-134 of FIG. 1, based on the identification of the electronic display screen 190 and may send the images 131-134 to the processor 540 to send to the electronic display screen 190 to display.

The processor 540, in some embodiments, may send the images taken during calibration to the electronic device(s) 580 to analyze and determine whether the electronic display screen 190 may require calibration. The electronic device(s) 580 may send the calibration data to the processor 540 to send to the electronic display screen 190. The embodiments that use the electronic devices 580 to perform some of the tasks of the calibration test procedure(s) may provide the technical advantage of reducing the requirement for the size computer readable media 550 and/or the processing power of the processor 540. The embodiments that perform the calibration test procedures by the mobile device may provide the technical advantage of doing the calibration test procedure(s) by the mobile device where there is no reliable network connection and/or where the network connection is slow.

The details of the calibration test of each electronic display screen 190, in some embodiments, may be stored in one or more databases (e.g., in non-volatile storage). The details of the calibration may include the identification of the electronic display screen, the time and date of the calibration test, the calibration tests performed, the images 131-134 displayed during calibration, the images taken by the mobile device's camera 290 during the calibration test, whether or not the electronic display screen 190 required any calibration, the calibration data (if any) sent to the electronic display screen 190 to calibrate the display screen, the identification of the mobile device 120, the identification of the fixture 110, the identification and the version of the mobile device's calibration application program, etc.

In some of these embodiments, the details of calibration test for the electronic display screen 190 may be stored in a blockchain. A blockchain is a growing list of records, or blocks, that are listed together using cryptography. Each block may include a cryptographic hash of the previous record, a timestamp, and the details of the calibration. As blocks each contain information about the block before it, they form a chain. Therefore, blockchains are resistant to modification of their data because once recorded, the data in any given block cannot be altered retroactively without altering all subsequent blocks. Storing the calibration data in blockchain may provide a perpetual nondestructive record of the calibration of each electronic device.

FIGS. 6-9 illustrate several examples of rotating, tilting, and/or adjusting the length of the fixture arm to point the mobile device's camera(s) to different points of an electronic display screen, according to different aspects of the present disclosure. With reference to FIG. 6, the arm 210 may have been bended by a few degrees by the motor(s) 250 in order for the camera 290 of the mobile device 120 to point to a point, such as, the center point 149 (FIG. 1) of the electronic display screen 190.

With reference to FIG. 7, the arm 210 may have been rotated and bended in order for the camera 290 of the mobile device 120 to point to a point, such as, the center right point 148 (FIG. 1) of the electronic display screen 190.

With reference to FIG. 8, the arm 210 may have been rotated, bended, and tilted such that the camera 290 (not shown) of the mobile device 120 may point to a point, such as, the lower right point 142 (FIG. 1) of the electronic display screen 190. With reference to FIG. 9, the arm 210 may have been rotated and bended such that the camera 290 of the mobile device 120 may point to a point, such as, the left center point 147 (FIG. 1) of the electronic display screen 190.

With reference to FIGS. 6-9, the processor 540 (FIG. 5) of the mobile device may follow a step by step calibration process. In each step, the processor 540 may send one or more signals to the motor(s) 250 to rotate, tilt, and/or bend the arm 210 to point the camera 290 of the mobile device to a particular point, or a particular region, of the electronic display screen 190.

Figure 10:
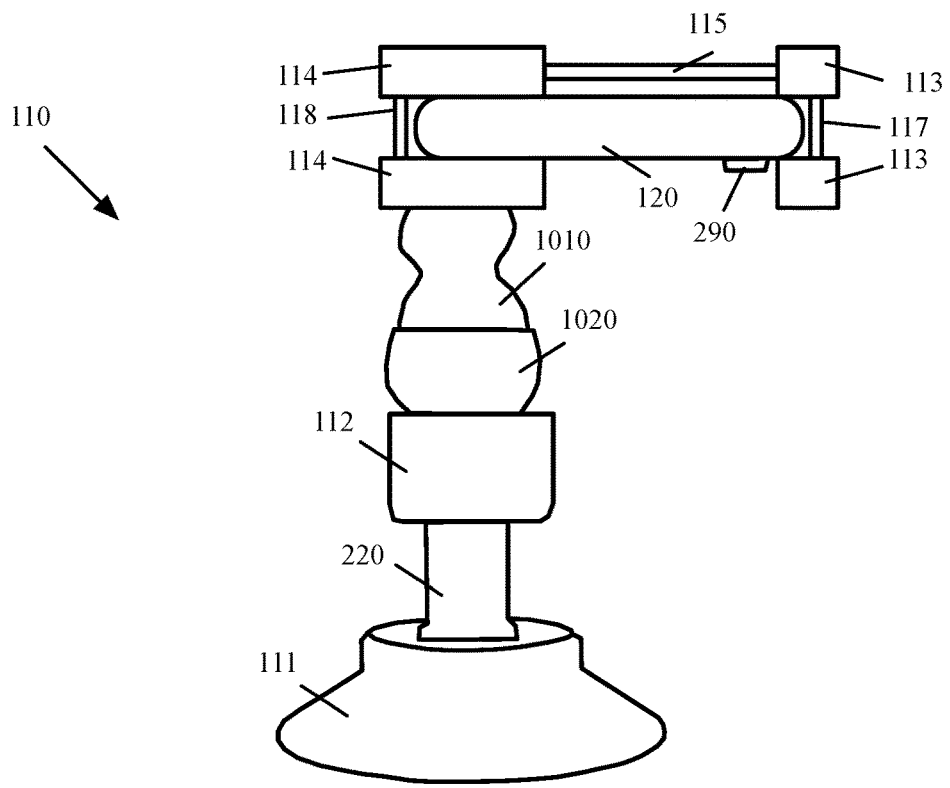
FIG. 10 is a left side view.

The mobile device fixture 110, in some of the present embodiments, may be manually controlled to rotate, tilt, and/or bend the arm 210. FIG. 10 is a left side view, and FIG.

11 is a bottom view, of a manually controlled fixture that is shown holding a mobile device, according to different aspects of the present disclosure. FIG. 12 is a back perspective view of a portion of the fixture and the mobile device of FIGS. 10-11, according to different aspects of the present disclosure.

Figure 11:
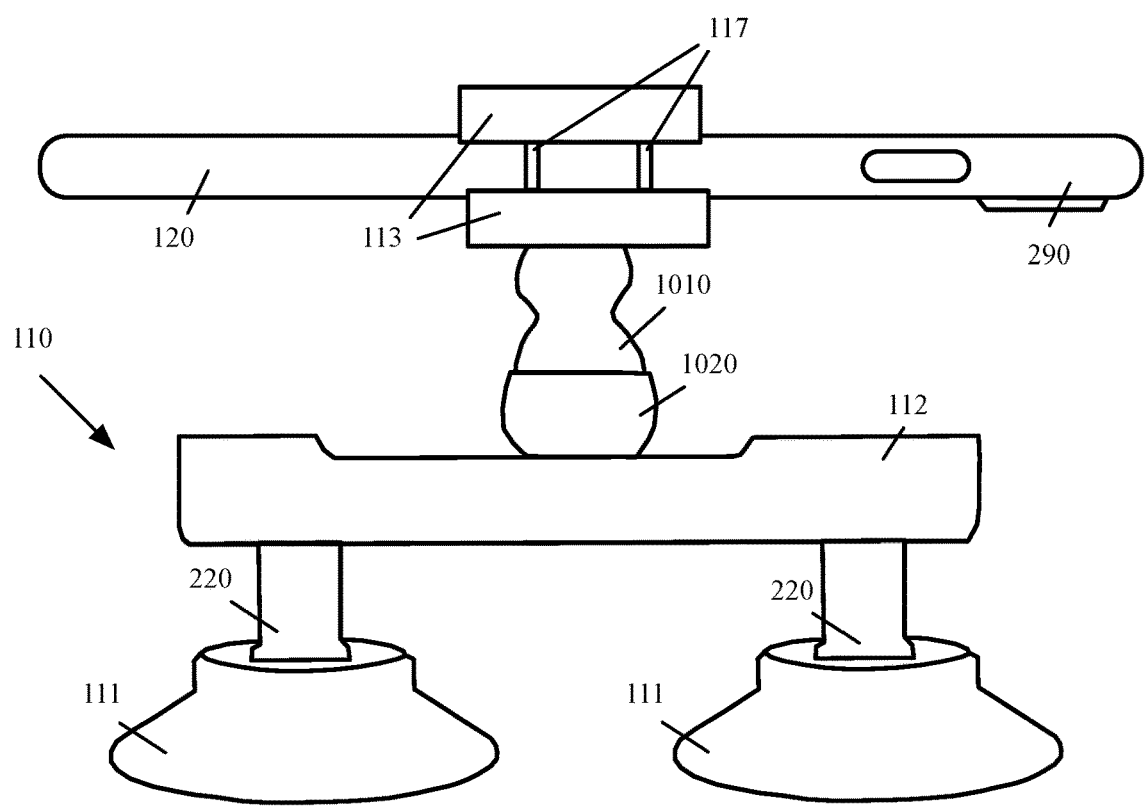
FIG. 11 is a bottom view, of a manually controlled fixture that is shown holding a mobile device, according to different aspects of the present disclosure.
Figure 12:
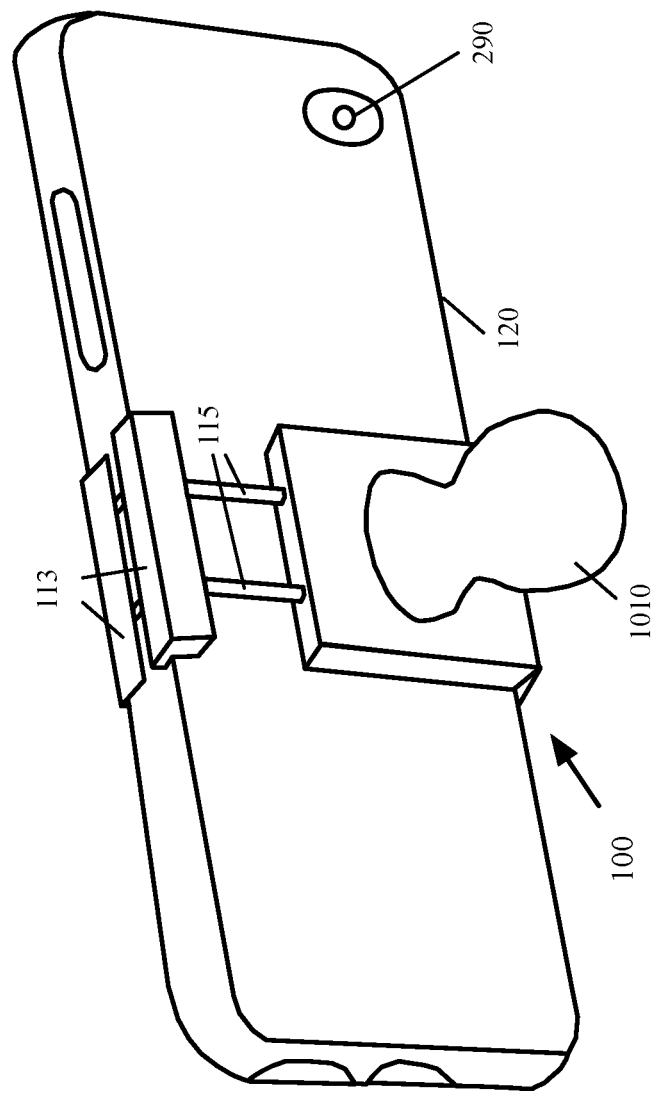
FIG. 12 is a back perspective view of a portion of the fixture and the mobile device of FIGS. 10-11, according to different aspects of the present disclosure.

With reference to FIGS. 10-12, the fixture 110 may include the suction cups 111, the shafts 220, the plate 112, the brackets 113 and 114, which may be similar to the corresponding components of FIG. 2-4. The fixture 110 of FIGS. 10-12 may not include the controller 250 or the motor(s) 250 of FIGS. 2-5. With reference to FIGS. 10-12, the fixture 110 may include a magnetic ball 1010 that may be coupled to a magnetic ball socket 1020. In some embodiments, the magnetic ball 1010 may be detached from the magnetic ball socket 1020 to allow the quick attaching and detaching of the mobile device 120 to the fixture 110. For example, FIG. 12 shows the magnetic ball 1010 detached from the magnetic ball socket 1020 (FIGS. 10-11).

The material of the magnet maybe, for example, and without limitations, neodymium, which has a high magnetic force that is sufficient to connect the magnetic ball coupler 1010 and the magnetic ball socket 1020. The camera 290 of the mobile device 120 may be pointed to different points or different regions of the electronic display screen 190 (FIG. 1) by manually rotating the magnetic ball 1010 inside the magnetic ball socket 1020 in a 3D space.

With reference to FIGS. 2-4 and 6-12, the fixture 110 of present embodiments is configured to be used as a calibration fixture to securely and accurately hold and move the mobile device 120 to collect optical calibration images from the electronic display 190 (FIG. 1). In the past, a significant amount of time during calibration of electronic display screen was spent on setting up the equipment. One of the technical advantages of the fixture 110 of the present embodiments is the rapidity of attaching the fixture to an electronic display screen and the rapidity of attaching a mobile device to the fixture 110. Another advantage of the fixture 110 of the present embodiments is the ability to use a different mobile device to verify the calibration done by a first mobile device. Having the ability to rapidly switch from one mobile device to another enables the calibration process to proceed at an accelerated rate. The electronic display screen to be calibrated, in some embodiment, may be the electronic display screen of another mobile device, such as a smartphone or a table computer.

The suction cups 111 of the present embodiments provide a mechanism for quickly mounting and dismounting of the fixture 110 to an electronic display screen. The plate 112, in some embodiments, may be longer than the plate 112 of FIG. 1. In these embodiments, the suction cups 111 may be attached to the body of the display apparatus 195, outside of the electronic display screen 190. It should be noted that other means of quick mounting and dismounting of the fixture 110 may be used. For example, and without limitations, the plate 112 may be attached to the edges of the display apparatus 195 by a set of fasteners, such as, a set of clips or clamps, instead of suction cups. The fixture 110, in some embodiments, may be placed on a tripod and may include a quick release mechanism to attach and detach the fixture to the tripod. Different embodiments may use a different number of suction cups 111 than two (e.g., one or more suction cups), depending on the weight and the size of the mobile devices that may be attached to the fixture 110.

The fixture 110 of the present embodiments provides the technical advantage of including one or more adjustable brackets (e.g., the brackets 113 and 114) that allow the quick mounting of different types of mobile devices with different widths and thicknesses for calibrating an electronic display screen.

The motorized arm 210 provides the technical advantage of moving the mobile device attached to the fixture in three dimensions under the control of the mobile device's processor to facilitate pointing the camera of the mobile device to specific points on the electronic display screen 190 during the setup and calibration.

The body of the fixture 110, in some embodiments, may at least partially be made, for example, and without limitations of plastic and/or metal. The body of the fixture 110, in some embodiments, may have a non-reflective black surface. The body of the fixture 110, in some embodiments, may generally be shaped as a rectangle, and may provide a stable mounting by widening the surface area in contact with the back of the mobile device.

Figure 13:
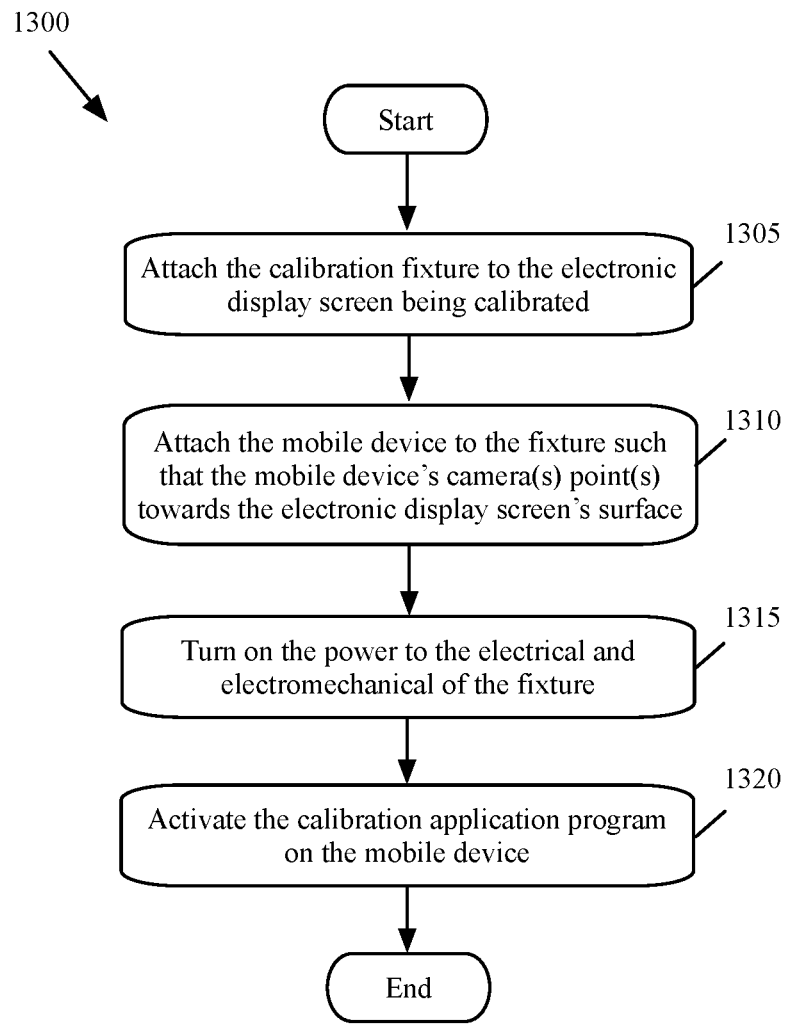
FIG. 13 is a flowchart illustrating an example process for setting up a calibration system to calibrate an electronic display screen, according to various aspects of the present disclosure.

In some embodiments, one or more processes may be performed to calibrate an electronic display screen. FIG. 13 is a flowchart illustrating an example process 1300 for setting up a calibration system to calibrate an electronic display screen, according to various aspects of the present disclosure. The process 1300, in some embodiments, may be performed by a person that is setting up the calibration equipment.

With reference to FIG. 13, the calibration fixture may be attached (at block 1305) to the electronic display screen that is being calibrated. For example, the calibration fixture 110 may be attached to the electronic display screen 190 using the suction cups 111, as described above with reference to FIG. 1. The mobile device may be attached (at block 1310) to the fixture such that the mobile device's camera(s) point(s) towards the electronic display screen's surface.

The power to the electrical and electromechanical components of the fixture may be turned on (at block 1315). For example, the fixture's power switch may be turned on as described above with reference to FIG. 5. The calibration application program may be activated (at block 1320) on the mobile device. For example, the calibration application program that is stored in the mobile device's computer readable media 550 may be activated as described above with reference to FIG. 5. The process 1315 may then end.

The specific operations of the process 1300 may not be performed in the exact order shown and described. Furthermore, the specific operations described with reference to FIG. 13 may not be performed in one continuous series of operations, in some aspects of the present disclosure, and different specific operations may be performed in different embodiments.

For instance, in some aspects of the present embodiments, the fixture may be placed on a tripod (at block 1305) using a quick release mechanism instead of being attached to the electronic display screen. As another example, the fixture (e.g., the fixture of FIGS. 10-12) may not include a motorized arm. In these embodiments, block 1315 may be skipped.

Figure 14A:
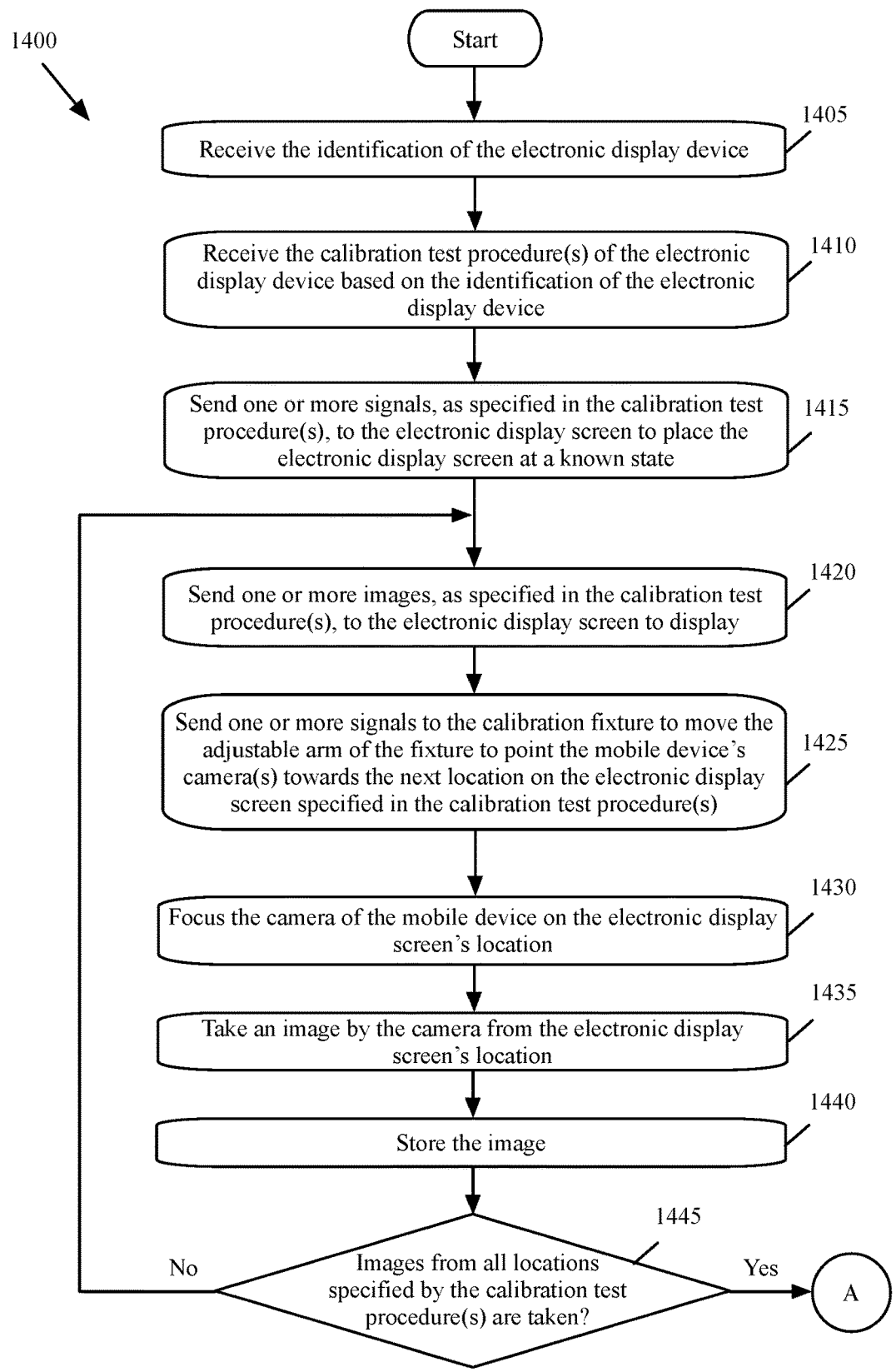
FIGS. 14A-14B show a flowchart illustrating an example process for calibrating an electronic display screen, according to various aspects of the present disclosure.
Figure 14B:
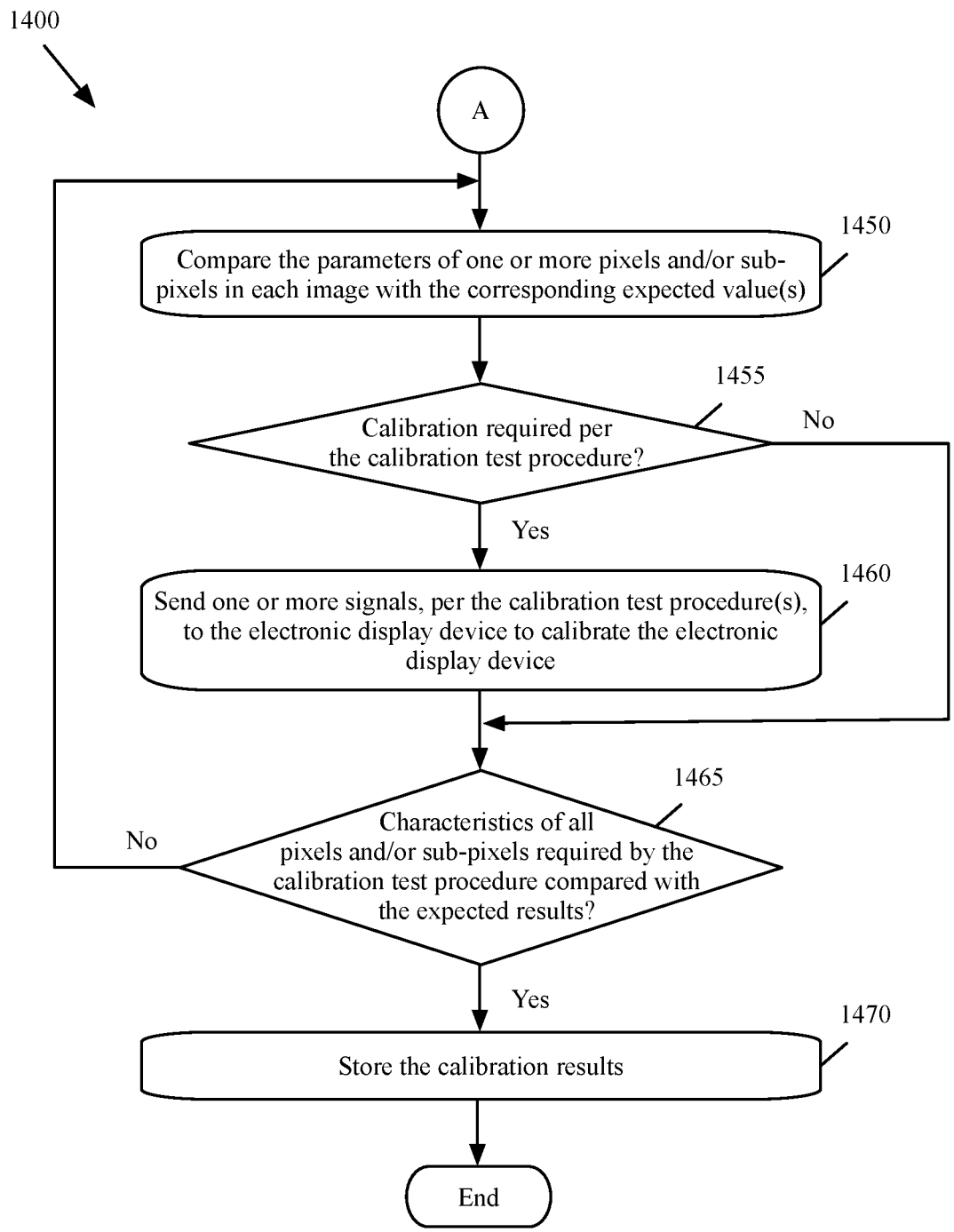

FIGS. 14A-14B show a flowchart illustrating an example process 1400 for calibrating an electronic display screen, according to various aspects of the present disclosure. The process 1400, in some embodiments, may be performed by the processor 540 of the mobile device 120 of FIG. 5 (e.g., by executing the calibration application program described above). In other embodiments, at least some of the process 1400 may be performed by processor(s) of the electronic device(s) 580.

With reference to FIG. 14, the electronic display screen's identification may be received (at block 1405). For example, in some embodiments, the electronic apparatus 195 (FIG. 1) of the electronic display screen 190 may be capable of connecting to the mobile device through a network, thorough a short-range communication protocol, such as, for example, and without limitations, Bluetooth, Wi-Fi, Zigbee, etc. In these embodiments, the mobile device 120 may receive the identification of the electronic display screen by interrogating the electronic apparatus of the electronic display screen. In other embodiments, the mobile device may receive the identification of the electronic display screen by interrogating the electronic apparatus of the electronic apparatus of the electronic display screen through a wired connection. In other embodiments, the identification of the electronic device screen may be interrogated by an electronic device, such as, for example, and without limitations, a dongle that may be connected to a port of the electronic display and the identification may then be provided to the mobile device by the dongle. Yet, in other embodiments, the mobile device may receive the electronic display screen's identification through a user interface of the calibration application program running on the mobile device (e.g., the electronic display screen's identification may be entered by an operator).

The calibration test procedure(s) of the electronic display screen may be received (at block 1410) based on the identification of electronic display screen. For example, some embodiments may generate calibration test procedures to test different types of electronic display screens. The calibration test procedures may depend on the physical, electrical, and/or optical characteristics of the electronic display screens. As described above, in some of the present embodiments, at least a portion of the calibration test procedures may be generated by a machine learning algorithm. The calibration test procedures, in some embodiments, may be stored in the computer readable media 550 (FIG. 5) of the mobile device 120. In other embodiments, the calibration test procedures may be stored in one or more databases, such as the database(s) 585. In these embodiments, the mobile device's processor 540 may send the identification of the electronic display screen 190 to the electronic device(s) 580 through the network(s) 590. In response, the electronic device(s) 580 may retrieve the calibration test procedure(s) of the electronic display screen 190 from the database(s) 585 and may send the calibration test procedures to the processor 540 of the mobile device 120.

One or more signals, as specified in the calibration test procedure(s), may be sent (at block 1415) to the electronic display screen to place the electronic display screen at a known state. For example, the signal(s) may be sent to select a particular display mode, to set the color, tint, contrast, etc., of the display screen to known states. One or more images, as specified in the calibration test procedure(s), may be sent (at block 1420) to the electronic display screen to display. For example, one or more images, such as the images 131-134 of FIG. 1 may be sent to the electronic display screen 190 to display. The images may include known color values (e.g., known known chrominance), known pixel intensity values (e.g., known luminance), etc. The images may be displayed at a specific region of the display screen 190, or the images may be displayed everywhere on the display screen 190.

In some embodiments, the mobile device may send the images to the electronic display screen during the calibration process. In some embodiments, the electronic apparatus of the electronic display screen may have stored the images used for calibration in a non-volatile memory of the electronic apparatus. In these embodiments, the process 1400 may send the address of the images to be displayed to the electronic display screen. In some embodiments, the mobile device may retrieve the images from one or more remote databases 585 through the network(s) 590.

One or more signals may be sent (at block 1425) to the calibration fixture to move the adjustable arm of the fixture to point the mobile device's camera(s) towards the next location on the electronic display screen specified in the calibration test procedure(s). During the calibration process, the motor(s) 250 of the fixture 100 may be configured and/or controlled, such that, the motor(s) may move the arm 210 (and the attached mobile device) to point the mobile device's camera(s) 290 to a predetermined region.

For example, the adjustable arm 210 of the fixture 110 (FIGS. 3-5 and 6-9) may be moved to point the camera 290 of the mobile device 120 to point towards a point or a region on the electronic display screen 190 (FIG. 1). For example., and without limitations, the adjustable arm 210 of the fixture 110 may be moved to point the camera 290 towards the upper right 141 (FIG. 1), the lower right 142, the lower left 143, the upper left 144, the upper center 145, the lower center 146, the left center 147, the right center 148, middle 149, etc., of the electronic display screen 190. The calibration test procedure(s) may specify several points to point the camera towards during the calibration test process.

The camera of the mobile device may be focused (at block 1430) on the location to which the camera is pointing. For example, the processor of the mobile device may command the mobile device's camera to focus on one of the points 141-149 of FIG. 1. The camera may be focused on a pixel or on a region around one of the points 141-149. Next, an image may be taken (at block 1435) by the camera from the electronic display screen's location. For example, the processor of the mobile device may command the mobile device's camera 290 to take a picture from the electronic display screen. The image may then be stored (at block 1440).

A determination may be made (at block 1445) whether images from all locations specified by the calibration test procedure(s) are taken. If yes, the process 1400 may proceed to block 1450, which is described below. Otherwise, the process 1400 may proceed back to block 1420, which was described above. It should be noted that the calibration test procedure, in some embodiments, may require taking more than one picture from the same location (e.g., from different images displayed at the same location). In these embodiments, when another picture has to be taken from the same location where the camera is currently pointing to, the process 1400 may not move the adjustable arm at block 1425.

At block 1450, the parameters of one or more pixels and/or sub-pixels in each image may be compared (at block 1450) with the corresponding expected value(s). For example, and without limitations, the pixel color values, the pixel intensity values, etc., of different pixels and/or sub-pixels of an image may be compared with a set of expected values. A determination may be made (at block 1455) whether calibration is required per the calibration test procedure. For example, calibration may be required if the parameters one or more pixels or sub-pixels are determined to be out of range per calibration test procedure(s) (e.g., the different between the parameters and the corresponding expected values exceeds a threshold).

When calibration is not required, the process 1400 may proceed to block 1465, which is described below. When calibration is required, one or more signals may be sent (at block 1460), per the calibration test procedure(s), to the electronic display screen to calibrate the electronic display screen. A determination may be made (at block 1465) whether the characteristics of all pixels and/or sub-pixels required by the calibration test procedure are compared with the expected results. If not, the process 1400, may proceed back to block 1450, which was described above.

Otherwise, the calibration test results may be stored (at block 1470). For example, the process 1400 may store the calibration results in the computer readable media 550 (FIG. 5) of the mobile device 120 and/or the process 1400 may send the calibration results to the electronic devices 580 to store in non-volatile storage in the database(s) 585. In some embodiments, the details of calibration for the electronic display screen 190 may be stored in a blockchain, as described above. Storing the calibration results in a blockchain provides the technical advantage that the blockchains may be resistant to modification of their data because once recorded and the data in any given block cannot be altered retroactively without altering all subsequent blocks. Storing the calibration data in blockchain may provide a perpetual nondestructive record of the calibration of each electronic device. The process 1400 may then end.

The specific operations of the process 1400 may not be performed in the exact order shown and described. Furthermore, the specific operations described with reference to FIGS. 14A-14B may not be performed in one continuous series of operations, in some aspects of the present disclosure, and different specific operations may be performed in different embodiments.

For instance, in some aspects of the present embodiments, the calibration tests may be done when the electronic display screen is set to different display modes. For example, a TV may have different display modes such as, cinema, sports, dynamic, vivid, standard, etc. In the embodiments that may change different parameters of the electronic display screen during calibration test, the process 1400 may return from block 1445 to block 1415 (instead of returning to block 1420) to set the electronic display screen to a different known state. In some embodiments, the process 1400 may compare the parameters of the pixels and/or sub-pixels of each image with the expected results after each image is taken. In these embodiments, the blocks 1450-1465 may be performed after block 1435 and before block 1445.

In addition, in some embodiments, some of the steps of the process 1400 may not be performed by the mobile device 120 (FIG. 5). For example, blocks 1450-1470, in some embodiments may be performed by the processor(s) of one or more of the electronic devices 580 that is/are connected to the mobile device through the network(s) 590. In these embodiments, the mobile device may send the images taken to the electronic devices 580 to perform the blocks 1450-1470. In some of these embodiments, the mobile device may send an image that is taken (at block 1435) to the electronic devices 580, instead of storing all images and then sending all images at once.

In some embodiments, an electronic display screen may not have the capability of communicating with the mobile device and/or may have to be manually calibrated. In these embodiments, the process 1400 may provide calibration instructions of block 1460 to a person, for example, through a user interface of the calibration application program of the mobile device, or through one or more signals sent to an electronic device associated with the person. The person may then perform the calibration operations either manually or with a device such as a dongle, depending on the capabilities of the electronic display screen.

In some embodiments, such as the embodiment of FIGS. 10-12) the fixture 110 may not have a controller 240 and motor(s) 250. In these embodiments, the fixture may be manually moved (at block 1425).

Many of the above-described features and applications may be implemented as software processes that are specified as a set of instructions recorded on a computer readable storage medium (also referred to as computer readable medium). When these instructions are executed by one or more processors (e.g., cores of processors, one or more single-core processors, one or more multi-core processors, or other processing units), they cause the processor(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions may be implemented as sub-parts of a larger program while remaining distinct software inventions. In some embodiments, multiple software inventions may also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 15:
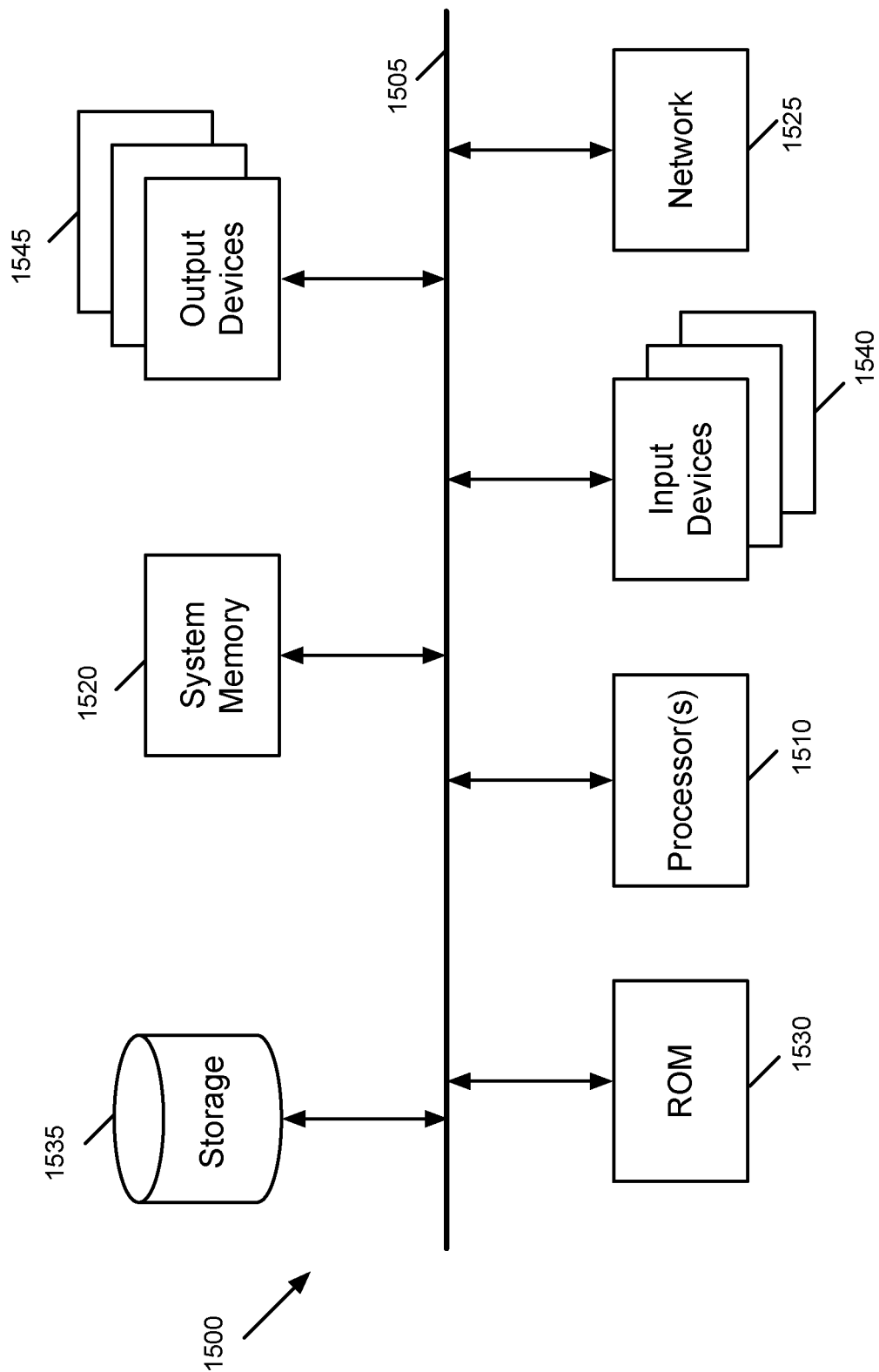
FIG. 15 is a functional block diagram illustrating an example electronic system, according to various aspects of the present disclosure.

FIG. 15 is a functional block diagram illustrating an example electronic system 1500, according to various aspects of the present disclosure. With reference to FIG. 15, some embodiments of the invention, such as for example, and without limitations, the mobile device, the electronic devices, the electronic display screens, the electronic circuitry of the fixture, etc., described above, may be implemented using the electronic system 1500. The electronic system 1500 may be used to execute any of the processes, methods, controls, virtualization, or operating system applications described above. The electronic system 1500 may be a computer (e.g., a desktop computer, a personal computer, a tablet computer, a server computer, a mainframe, a blade computer etc.), phone (e.g., a smartphone), personal digital assistant (PDA), or any other sort of electronic device. Such an electronic system may include various types of computer readable media and interfaces for various other types of computer readable media. The electronic system 1500 may include a bus 1505, processor(s) 1510, a system memory 1520, a read-only memory (ROM) 1530, a permanent storage device 1535, input devices 1540, and output devices 1545.

The bus 1505 may collectively represent all system, peripheral, and chipset buses that communicatively connect the numerous internal devices of the electronic system 1500. For example, the bus 1505 may communicatively connect the processor(s) 1510 with the read-only memory 1530, the system memory 1520, and the permanent storage device 1535. From these various memory units, the processor(s) 1510 may retrieve instructions to execute and data to process in order to execute the processes of the invention.

The read-only-memory 1530 may store static data and instructions that are needed by the processor(s) 1510 and other modules of the electronic system. The permanent storage device 1535, on the other hand, may be a read-and-write memory device. This device is a non-volatile memory unit that may store instructions and data even when the electronic system 1500 is off. Some embodiments of the invention may use a mass-storage device (such as a magnetic or optical disk and its corresponding disk drive) as the permanent storage device 1535.

Other embodiments may use a removable storage device (such as a flash drive, etc.) as the permanent storage device. Like the permanent storage device 1535, the system memory 1520 may be a read-and-write memory device. However, unlike storage device 1535, the system memory may be a volatile read-and-write memory, such as random access memory. The system memory may store some of the instructions and data that the processor needs at runtime. In some embodiments, the invention's processes may be stored in the system memory 1520, the permanent storage device 1535, and/or the read-only memory 1530. From these various memory units, the processor(s) 1510 may retrieve instructions to execute and data to process in order to execute the processes of some embodiments.

The bus 1505 may also connect to the input and output devices 1540 and 1545. The input devices may enable the user to communicate information and select commands to the electronic system. The input devices 1540 may include one or more cameras, alphanumeric keyboards, pointing devices (also called "cursor control devices"). The output devices 1545 may display images generated by the electronic system. The output devices may include printers and display devices, such as cathode ray tubes (CRT) or liquid crystal displays (LCD). Some embodiments may include devices such as a touchscreen that function as both input and output devices.

Finally, as shown in FIG. 15, the bus 1505 may also couple the electronic system 1500 to a network 1525 through one or more wireless transceivers and/or a network adapter (not shown). In this manner, the computer may be a part of a network of computers (such as a local area network ("LAN"), a wide area network ("WAN"), an Intranet, or a network of networks, such as the Internet. Any or all components of the electronic system 1500 may be used in conjunction with the invention.

Some embodiments may include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processor and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments may be performed by one or more integrated circuits, such as application specific integrated circuits (ASICs) or field programmable gate arrays (FPGAs). In some embodiments, such integrated circuits may execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A fixture configured to hold a mobile device for calibrating an electronic display screen, the fixture comprising:
   an adjustable arm;
   a controller comprising a processor;
   a set of one or more motors;
   a set of one or more suction cups configured to attach the fixture to the electronic display screen;
   a set of one or more brackets attached to the adjustable arm and configured to hold the mobile device such that a camera of the mobile device points towards the electronic display screen;
   wherein the processor of the controller is configured to:
      receive a set of one or more signals from the mobile device to move the adjustable arm to point the camera of the mobile device towards a point on the electronic display screen; and
      in response to receiving the set of signals from the mobile device, send a set of one or more signals to the set of motors to move the adjustable arm to point the camera of the mobile device towards the point on the electronic display screen.

2. The fixture of claim 1, wherein the adjustable arm comprises a plurality of telescopic sections configured to move against each other by the set of motors to adjust a length of the adjustable arm.

3. The fixture of claim 1, wherein the adjustable arm is configured to rotate around an axis by the set of motors.

4. The fixture of claim 1, wherein the adjustable arm is configured to move in three dimensions by the set of motors.

5. The fixture of claim 1, wherein the adjustable arm comprises a plurality of bendable sections configured to bend by the set of motors.

6. The fixture of claim 1, wherein the adjustable arm is configured to move along one or more axes by the set of motors.

7. The fixture of claim 1, wherein the adjustable arm is configured to move in three dimensions by the set of motors.

8. The fixture of claim 1, wherein the set of brackets are configured to adjust to a thickness of different mobile devices.

9. The fixture of claim 1, wherein the set of brackets are configured to adjust to a width of different mobile devices.

10. The fixture of claim 1 further comprising a set of one or more wireless transceivers configured to wirelessly communicate with a set of one or more wireless transceivers of the mobile device.

11. The fixture of claim 1, wherein the processor of the controller of the fixture is configured to communicate with a processor of the mobile device through a wired connection.

12. A method of performing a calibration test of an electronic display screen by a mobile device held by an adjustable arm of a fixture attached to the electronic display screen, the method comprising:
receiving an identification of the electronic display screen by the mobile device;
based on the identification, receiving a test procedure by the mobile device to calibrate the electronic display screen;
sending one or more images from the mobile device to the electronic display screen to display, as specified by the test procedure;
sending a set of one or more signals from the mobile device to a processor of a controller of the fixture to move the adjustable arm to point a camera of the mobile device towards a point on the electronic display screen, as specified by the test procedure;
in response to receiving the set of one or more signals to move the adjustable arm, sending a set of one or more signals, from the processor of the controller of the fixture, to a set of one or more motors of the fixture to move the adjustable arm to point the camera of the mobile device towards the point on the electronic display screen;
by the processor of the mobile device, commanding the camera of the mobile device to take an image of a region around the point;
in response to the command from the processor of the mobile device, taking the image of the region by the camera of the mobile device;
comparing a set of parameters of at least one pixel or one sub-pixel of the image with a set of corresponding expected value; and
by the processor of the mobile device, sending one or more signals to the electronic display screen to calibrate the electronic display screen when a difference between the set of parameters and the corresponding expected values exceeds a threshold.

13. The method of claim 12 further comprising by the processor of the mobile device, commanding the camera of the mobile device to focus on the point prior to taking the image.

14. The method of claim 12 further comprising:
sending the image, by the processor of the mobile device, to an electronic device connected to the mobile device through a network;
performing said comparing by the electronic device; and
receiving a result of the comparison by the processor of the mobile device from the electronic device through the network.

15. The method of claim 12, wherein the comparing is done by the processor of the mobile device.

16. The method of claim 12 further comprising storing data regarding the calibration test in a non-volatile storage.

17. The method of claim 16, wherein the stored data regarding the calibration test comprises one or more of the identification of the electronic display screen, a time and a date of the calibration test, whether or not the electronic display screen required any calibration, the calibration test performed, the images sent to the electronic display screen to display, and the images taken by the mobile device's camera.

18. The method of claim 16, wherein the stored data regarding the calibration test comprises the calibration data sent by the processor of the mobile device to the electronic display screen.

19. The method of claim 16, wherein the stored data regarding the calibration test comprises one or more of an identification of the mobile device, an identification of the fixture, and an identification of the mobile device.

20. The method of claim 16, wherein the data regarding the calibration test is stored in a blockchain.

* * * * *